Feb. 28, 1961 M. A. CANO 2,972,820
EDUCATIONAL TRAINING DEVICE
Filed Oct. 6, 1958

INVENTOR.
MARY ARLENE CANO
BY
Gardner & Zimmerman
ATTORNEYS

United States Patent Office 2,972,820
Patented Feb. 28, 1961

2,972,820
EDUCATIONAL TRAINING DEVICE
Mary Arlene Cano, 115 Newport Drive, Irvington, Calif.
Filed Oct. 6, 1958, Ser. No. 765,436
2 Claims. (Cl. 35—56)

The present invention relates to an educational or training device adapted for use in the accomplishment of particular physical dexterity. More particularly, the invention relates to a device for teaching the manual manipulation of clothing fastening means and is adapted for use by children or those with physical handicaps of either a temporary or permanent nature.

As regards the applicability of the present invention it has been found that in many instances of severe physical injury the ability to accomplish even the most common physical tasks of minor manual dexterity is entirely lost and can be regained only through a complete relearning as though from infancy. In particular, the manipulation of common fastening devices normally employed on wearing apparel poses a major problem that is overcome only by repeated practice and to date there has been a conspicuous absence of training aids in this field.

The invention hereinafter disclosed provides a training aid for the learning of manual dexterity in the use of clothing fasteners. Not only does the invention incorporate a plurality of different fastening devices in fully operable condition but provides same in a single readily portable unit. Further, the invention provides for the maintaining of the fastening means in a rigid plane for obviating the difficulties of proper positioning of the fasteners to operate same. This latter point is of importance in that all faculties and facilities may thereby be directed to mastering the fastening means operation without requiring additional effort to maintain same in position to be operated.

It is an object of the present invention to provide a fastener training aid incorporating a plurality of operable fastening means in a single portable unit.

It is another object of the present invention to provide a folding element having a plurality of fastening means secured to the inner surface thereof as an aid for learning manual manipulation of fastening means.

It is a further object of the present invention to provide a training device including a foldable sheet having substantially a coextensive pocket therein for receiving a rigid member and a plurality of different fastening means mounted in operable condition upon material affixed to one surface of said foldable sheet.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The invention is illustrated in the accompanying drawing, wherein.

Figure 1:
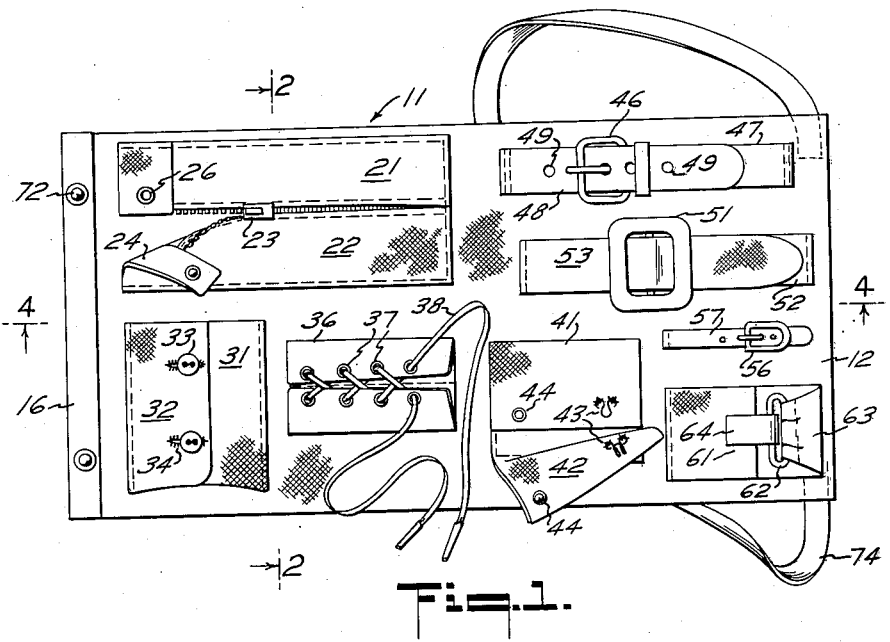
Figure 1 is a plan view of the training device in open position.
Figure 3:
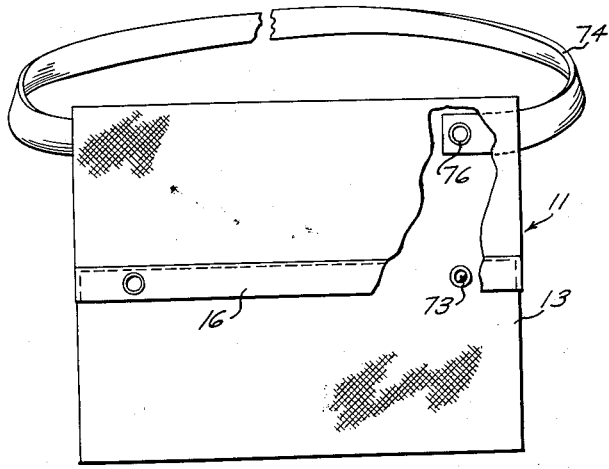
Figure 3 is a frontal view of the training device in closed position ready for transportation.
Figure 2:
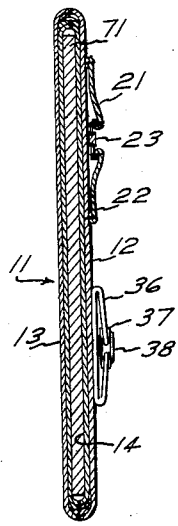
Figure 2 is a transverse sectional view taken at 2—2 of Figure 1.
Figure 4:
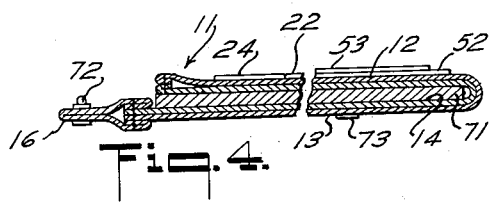
Figure 4 is a longitudinal section view taken at 4—4 of Figure 1.

Considering now the illustrated preferred embodiment of the invention and referring to the drawing there will be seen to be provided a pliable or foldable sheet 11 of a material such as duck or other cloth. This sheet 11 is formed of an inner and outer layer 12 and 13, respectively, as by folding the sheet over, see Figure 4. The sheet layers 12 and 13 are secured together as by sewn seams along a pair of sides to define a pocket 14 within the sheet. This pocket 14 has an open end from which the outer sheet layer 13 is extended to form a narrow flap 16. In practice this flap 16 may be preferably formed of a separate piece of material sewn to the lower sheet layer 13 across same at the pocket opening, as shown in Figure 4.

Upon the inner exposed surface of the sheet 11 there are secured a plurality of fastening means in operable relation between individual components of each. These fastening means include each of the common closure or securing means found on wearing apparel. As illustrated, at the upper left hand corner of the sheet there are provided a pair of adjacent cloth strips 21 and 22 sewn to the inner sheet layer 12 along the outer sides and across the bottom thereof. A zipper fastener 23 is attached along adjacent edges of the strips for joining same together and a flap 24 may be provided on one strip to overlap the other strip. A snap fastener 26 is secured one part to the flap 24 and the other part to the overlapped strip in position for engagement. Below the zipper arrangement just described are a pair of cloth strips 31 and 32 sewn upon the inner sheet layer 12 with overlapping loose edges and buttons 33 secured to one strip 31 and button holes 34 formed in the other strip 32. These two strips are thus readily connected and disconnected by manipulation of buttons and aligned button holes. In both described fastening means one transverse edge of the strips is sewn down so that the fastening means are automatically aligned and manual manipulation of the fastening means is not complicated by any strip manipulation being required.

A piece of light leather or the like 36 is sewn to the inner sheet layer 12 generally along the center of the leather with opposite edges folded together with aligned eyes 37 formed along each edge. Lacing 38 is threaded through the eyes 37 in the manner of a shoe lacing and may be tied together at the ends in a bow knot also like a shoe. Preferably the lacing is actually a shoe lace as this element of the invention provides a facsimile of a shoe and the central seam attachment of the leather provides for ample lacing room during manipulation of the lace. Adjacent the shoe lacing element there are provided hook and eye and snap fastening means mounted upon a piece of cloth 41 sewn to the inner sheet layer 12 with a loose flap 42 adapted to fold over another portion thereof. Hook and eye elements 43 are secured one to the flap 42 and the other to remaining portion of the cloth piece in position for engagement while a snap fastener 44 is provided with the respective elements likewise mounted. Thus by folding over the flap 42 the hook and eye 43 may be engaged and also the snap fastener may be engaged.

Various buckle and clamp connectors are also provided on the inner surface of the sheet 11. A conventional tongue buckle 46 is provided in attachment with one end of a strip 47 of light leather or heavy fabric while the other strip end is sewn to the sheet layer 12. A second strip 48 is provided with a plurality of aligned eyelets 49 and is sewn to the sheet layer 12 with the eyelet end free to pass through the buckle 46. A friction buckle 51 is secured to one end of a strip of material 52 while a second strip of material 53 is adapted to pass through the buckle, opposed ends of the strips 52 and 53 being sewn to the inner sheet layer 12. Also there may be provided a miniature tongue buckle 56 of the type employed on watch bands and the like and secured to a strip of material with a perforated strip of material 57 adapted to be passed therethrough, both strips being secured as by sewing to the inner sheet layer. A clamp connector 61 is mounted with the ring 62 thereof through a loop of material 63 sewn to the inner sheet layer and having a free end adapted to be engaged by the clamp 64 mounted on the ring 62.

As will be seen from the foregoing, there are provided upon the inner surface of the sheet 11 a plurality of operably mounted fastening means of the type commonly employed on wearing apparel and adapted for ready operation through manual manipulation of the members thereof. The pocket 14 formed in the sheet 11 provides a space for the insertion of a stiffener such as a thin board or the like 71. By the insertion of the board 71 in unfolded position of the sheet 11 a firm backing is provided for the fastening means so that manual manipulation thereof is materially facilitated. Also, removal of the board 71 allows folding of the sheet into a compact carrying case as described below and provides for increasing the difficulty of manipulating the fasteners as the user becomes more proficient thereat.

Upon the inner surface of the sheet flap 16 there are provided in spaced relation a pair of male element snap fasteners 72 and upon the outer surface of the sheet in spaced relation from the opposite sheet end are provided corresponding female elements 73 of these snap fasteners. The sheet is adapted to be folded approximately in thirds and secured by engaging the male and female elements 72 and 73 whereby all of the fastening means on the inner surface of the sheet 11 are entirely covered, i.e., disposed on the interior folded surface of the sheet. Transportation of the neat package or case formed by the folded sheet is facilitated by the provision of a carrying strap 74 attached as by snap fasteners 76 to the outer surface of the sheet adjacent the other end thereof from the flap 16. The folded sheet with attached strap is quite compact and readily portable with all of the training fastening means fully concealed so as to present a pleasing appearance much as a conventional purse or the like. The invention is immediately available for use by disengaging the closing snaps and unfolding the sheet 11 so that the user may readily carry the training device about and practice upon the fastening means thereof in free moments.

It has been found that the present invention provides a highly useful tool in the teaching of fastener manipulation as the fastening means are readily accessible without the difficulty of handling clothing and also most types of clothing fasteners are included so as to be available for manipulation. The sheet structure with included pocket is also highly advantageous, particularly in early training wherein a rigid backing provided by insertion of a stiffener materially facilitates fastener manipulation.

What is claimed is:

1. A training device comprising a sheet formed of separate layers of pliable material joined about three edges to form an open ended pocket therebetween for insertion of stiffening means substantially coextensive with said sheet and foldable into flat folded position with means fastening same in such position, a plurality of different fastening means mounted in operable position upon the inner layer of said sheet for manual manipulation to engage and disengage same with said last named means spaced from a transverse medial axis parallel to said open end whereby said material may be folded, and a carrying strap releasably secured to said sheet for transport of same in folded and unfolded position.

2. A training device for teaching manual manipulation of clothing fasteners comprising a double thickness sheet of pliable material defining an open ended pocket therein substantially coextensive with said sheet for insertion of stiffening means and having connectors for securing said sheet in double folded position with the interior sheet surface completely concealed, a planar board insertible into said pocket, a carrying strap attached to the outer sheet surface, and a plurality of different fastening means comprising a zipper connector between two strips of material affixed to the inner sheet surface, lacing through eyes formed along adjacent edges of a piece of material affixed to the inner sheet surface, buttons secured to a first piece of material in alignment with button holes in a second piece of material with both pieces of material secured to the inner surface of said sheet, and a plurality of buckle and clamp connectors affixed in operable relation upon material secured to the inner surface of said sheet whereby said fastening means are manually manipulatable in unfolded sheet position.

References Cited in the file of this patent

UNITED STATES PATENTS

| | | |
|---|---|---|
| 1,216,015 | Tichenor | Feb. 13, 1917 |
| 1,962,687 | Hodge | June 12, 1934 |
| 2,129,857 | Metzger | Sept. 13, 1938 |
| 2,275,956 | Grace | Mar. 10, 1942 |
| 2,431,472 | Fistell | Nov. 25, 1947 |
| 2,501,902 | Howell | Mar. 28, 1950 |
| 2,527,242 | Clark | Oct. 24, 1950 |

FOREIGN PATENTS

| | | |
|---|---|---|
| 387 of 1902 | Great Britain | Oct. 9, 1902 |